US009888133B2

(12) United States Patent
Kida

(10) Patent No.: US 9,888,133 B2
(45) Date of Patent: Feb. 6, 2018

(54) IMAGE FORMING APPARATUS THAT DELIVERS IMAGE DATA TO DIGITAL SIGNAGE DEVICE

(71) Applicant: KYOCERA Document Solutions Inc., Osaka (JP)

(72) Inventor: Yasuhiko Kida, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/941,289

(22) Filed: Nov. 13, 2015

(65) Prior Publication Data

US 2016/0142564 A1    May 19, 2016

(30) Foreign Application Priority Data

Nov. 17, 2014   (JP) ................................ 2014-232833

(51) Int. Cl.
*H04N 1/00* (2006.01)
*G06F 3/14* (2006.01)
*H04N 1/21* (2006.01)

(52) U.S. Cl.
CPC ....... *H04N 1/00129* (2013.01); *G06F 3/1423* (2013.01); *H04N 1/0044* (2013.01);
(Continued)

(58) Field of Classification Search
None
See application file for complete search history.

(56) References Cited

U.S. PATENT DOCUMENTS

2003/0098894 A1* 5/2003 Sheldon ................ G06F 3/0481
715/853
2004/0012576 A1* 1/2004 Cazier ..................... G06T 11/00
345/204

(Continued)

FOREIGN PATENT DOCUMENTS

GB        2473238 A     3/2011
JP     2013-125147 A    6/2013

OTHER PUBLICATIONS

Extended European Search Report dated Jul. 8, 2016 mailed in the corresponding European Patent Application No. 15194503.7.

*Primary Examiner* — Mohammad Ghayour
*Assistant Examiner* — Pawandeep Dhingra
(74) *Attorney, Agent, or Firm* — IP Business Solutions, LLC

(57) ABSTRACT

An image forming apparatus includes an image reading section, a storage section, a communication section, an acceptance section, and an operation control section. The storage section has a plurality of storage regions at least one or more of which are signage-specific storage regions associated one-to-one with one or more digital signage devices. Each of the signage-specific storage region stores: a plurality of pieces of image data generated by the image reading section having read a number of documents; and setting data indicating a display setting of how the relevant digital signage device displays the pieces of image data. When the acceptance section accepts a delivery instruction, the operation control section allows the communication section to send the pieces of image data and the setting data both stored in the signage-specific storage region associated with the relevant digital signage device designated in the delivery instruction to the relevant digital signage device.

2 Claims, 14 Drawing Sheets

(52) U.S. Cl.
CPC ... *H04N 1/2104* (2013.01); *G09G 2320/0613* (2013.01); *H04N 2201/0089* (2013.01); *H04N 2201/0094* (2013.01)

(56) References Cited

U.S. PATENT DOCUMENTS

| | | | |
|---|---|---|---|
| 2009/0195828 A1* | 8/2009 | Urakawa | H04N 1/00233 358/1.15 |
| 2010/0302595 A1* | 12/2010 | Yamada | G06K 9/4642 358/1.18 |
| 2011/0288915 A1* | 11/2011 | Mochizuki | G06Q 30/02 705/14.4 |

* cited by examiner

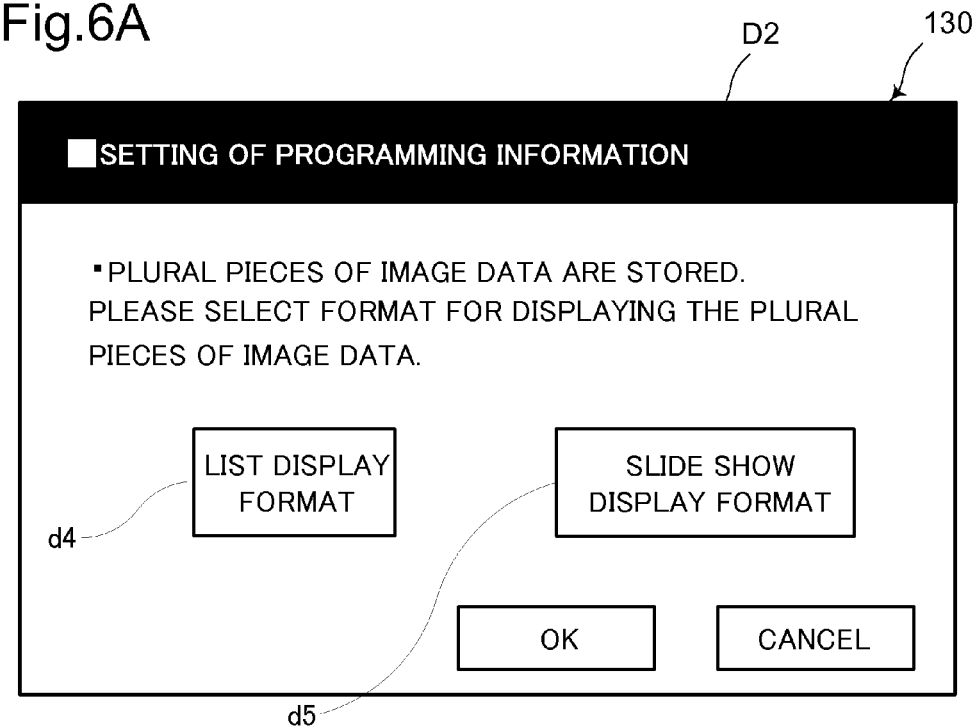
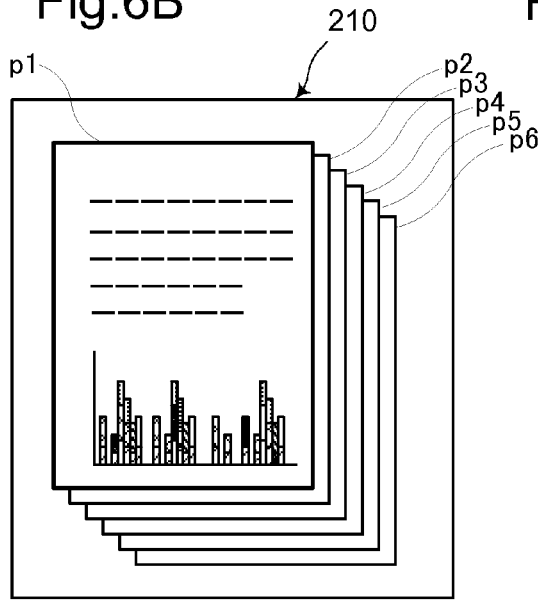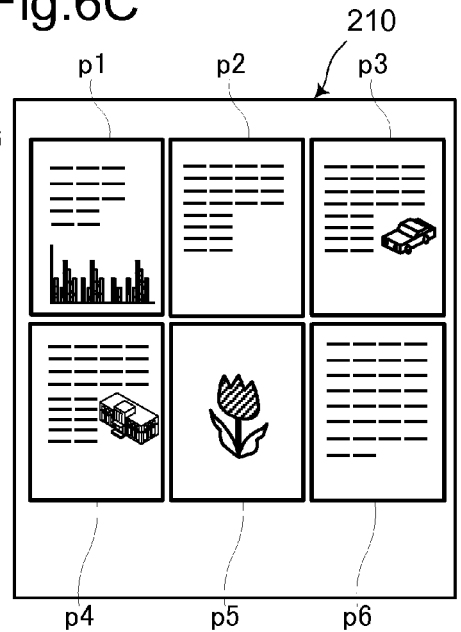

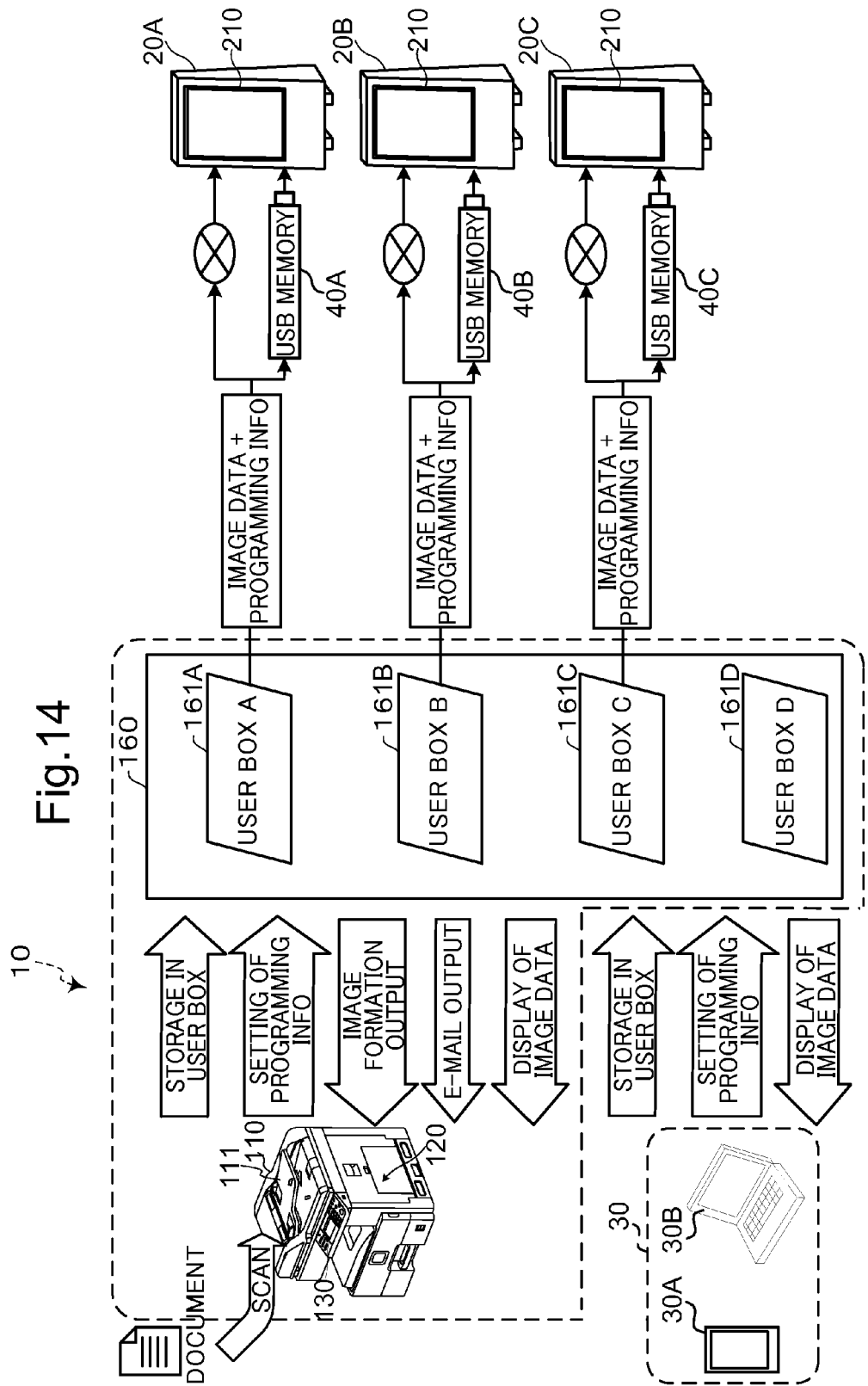

IMAGE FORMING APPARATUS THAT DELIVERS IMAGE DATA TO DIGITAL SIGNAGE DEVICE

INCORPORATION BY REFERENCE

This application claims priority to Japanese Patent Application No. 2014-232833 filed on Nov. 17, 2014, the entire disclosure of which is incorporated herein by reference.

BACKGROUND

The present disclosure relates to image forming apparatuses and computer-readable non-transitory recording media with an image forming apparatus control program recorded thereon and particularly relates to a technique for delivering image data to external digital signage devices.

In recent years digital signage devices are becoming widespread as means for giving notice to many people of information in public facilities and so on. By generating and registering image data or the like for information on a dedicated management server provided externally of a digital signage device, an operator can change the contents of an informing image to be displayed on the digital signage device. Thus, as compared to conventional informing means, such as a notice and a notice board (bulletin board), the digital signage device can avoid the trouble of having to remake the contents of information, which makes it easy to offer up-to-data information.

SUMMARY

A technique improved over the aforementioned technique is proposed as one aspect of the present disclosure.

An image forming apparatus according to an aspect of the present disclosure includes an image reading section, a storage section, a communication section, an acceptance section, and an operation control section. The image reading section is operable to read an original document and generate image data from the read original document. The storage section is operable to store the image data generated by the image reading section. The communication section is operable to communicate data with one or more external digital signage devices. The acceptance section is configured to accept a delivery instruction to deliver the image data with the one or more digital signage devices designated as destinations. The operation control section is configured to control the operation of reading the original document and generating the image data performed by the image reading section, the operation of storing the image data performed by the storage section, and the operation of communicating data performed by the communication section.

Furthermore, the storage section has a plurality of storage regions at least one or more of which are signage-specific storage regions associated one-to-one with the one or more digital signage devices.

Each of the signage-specific storage regions stores: a plurality of pieces of the image data generated by the image reading section having read a number of original documents; and setting data indicating a display setting of how the relevant digital signage device displays the plurality of pieces of image data.

The operation control section is configured to, when the acceptance section accepts the delivery instruction, allow the communication section to send the plurality of pieces of image data and the setting data both stored in the signage-specific storage region associated with the relevant digital signage device designated in the delivery instruction to the digital signage device designated in the delivery instruction.

A computer-readable non-transitory recording medium according to another aspect of the present disclosure contains an image forming apparatus control program recorded thereon, the image forming apparatus control program allowing a computer to function as the above-described operation control section and the above-described acceptance section.

BRIEF DESCRIPTION OF THE DRAWINGS

FIG. 6A is a view showing an example of a programming information acceptance screen displayed on the display section of the image forming apparatus according to the one embodiment of the present disclosure.

FIG. 6B is a view showing an example of a screen displayed on a digital signage device.

FIG. 6C is a view showing an example of a screen displayed on a digital signage device.

FIG. 14 is a diagram schematically showing a processing flow in a digital signage system according to Modification 3.

DETAILED DESCRIPTION

Hereinafter, a description will be given of an image forming apparatus and a computer-readable non-transitory recording medium with an image forming apparatus control program recorded thereon, both according to one embodiment of the present disclosure, with reference to the drawings.

Figure 1:
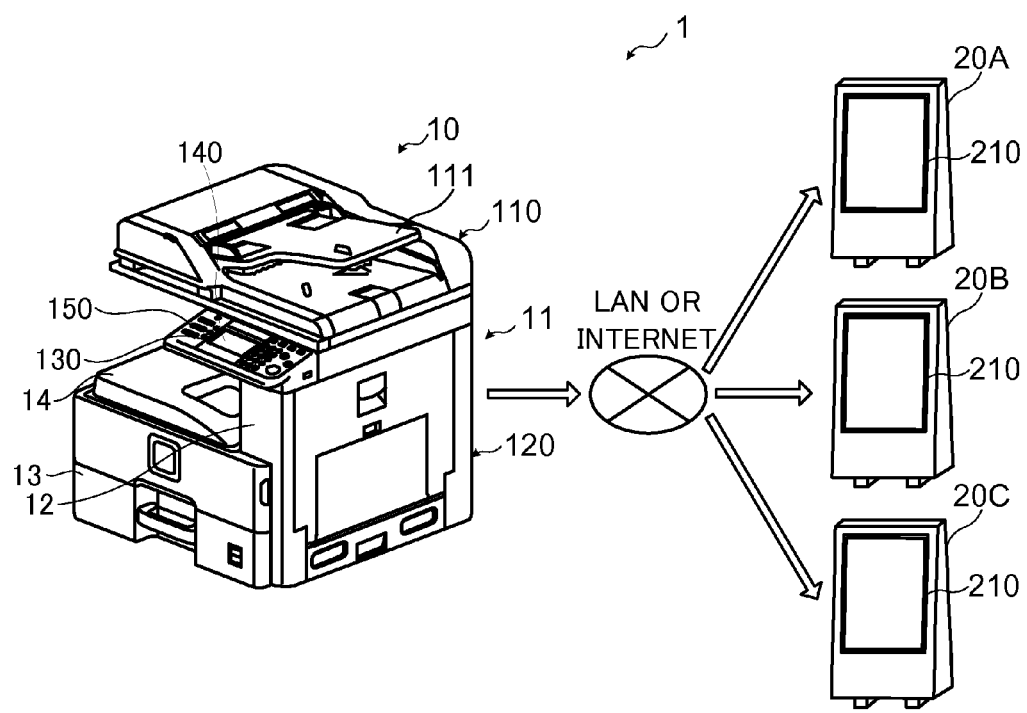
FIG. 1 is a view showing a schematic configuration of a digital signage system according to one embodiment of the present disclosure.
Figure 2:
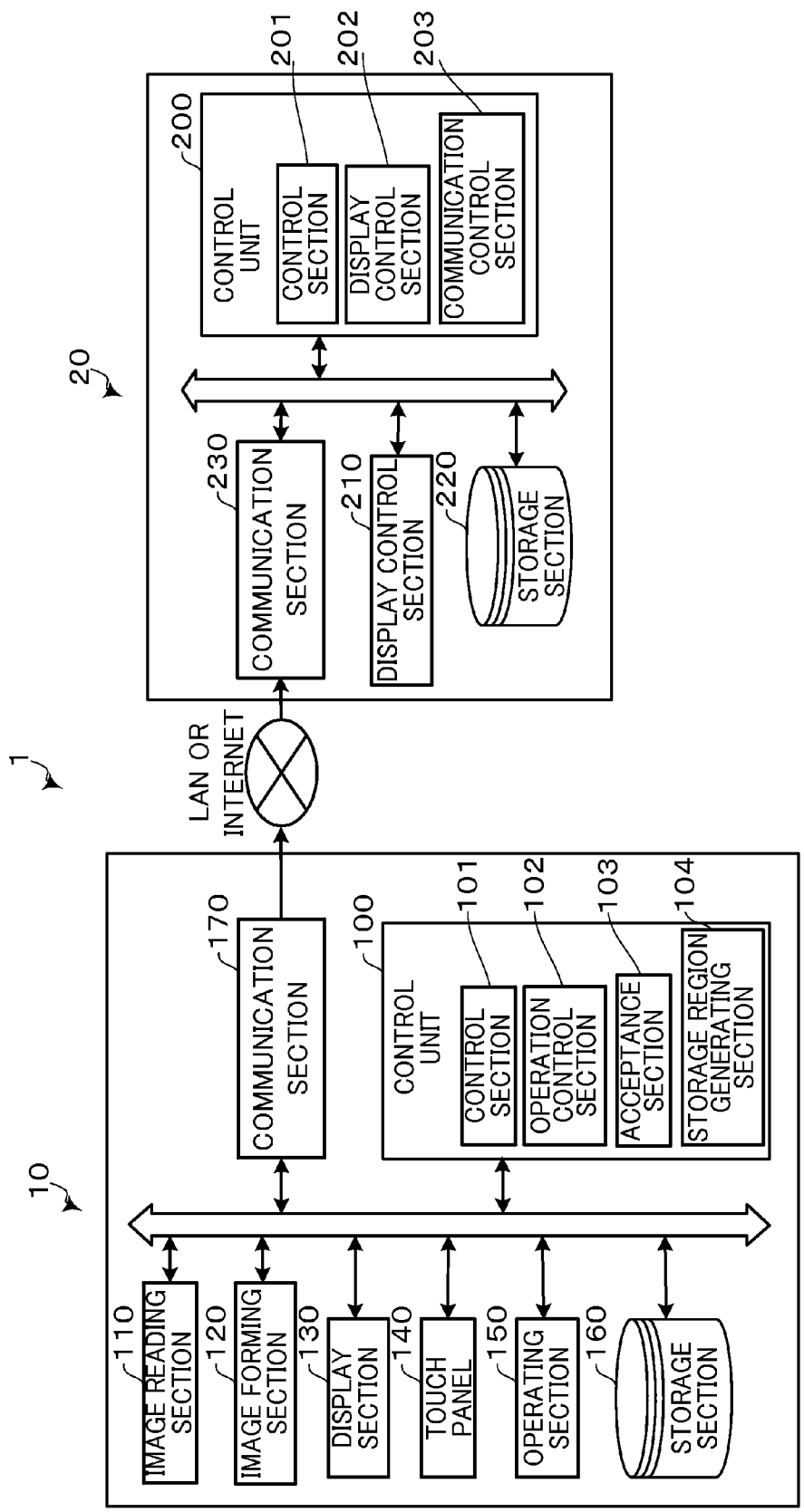
FIG. 2 is a block diagram showing an internal configuration of the digital signage system according to the one embodiment of the present disclosure.

FIG. 1 is a view showing a schematic configuration of a digital signage system according to one embodiment of the present disclosure. FIG. 2 is a block diagram showing an internal configuration of the digital signage system according to the one embodiment of the present disclosure.

The digital signage system 1 includes an image forming apparatus 10 and a plurality of digital signage devices 20A, 20B and 20C connected via a LAN (local area network) or the like to the image forming apparatus 10. The image forming apparatus 10 is configured to send to the digital signage devices 20A, 20B and 20C image data generated by an image reading section 110 having read an original document, together with programming information (setting data) indicating a setting of how the digital signage devices 20A, 20B and 20C display the image data.

Note that the digital signage devices 20A, 20B and 20C have the same configuration and, therefore, unless otherwise distinguished, they and each of them are indicated at 20 from which "A", "B", and "C" are omitted.

The image forming apparatus 10 is a multifunction peripheral having multiple functions including, for example, a copy function, a print function, a scan function, and a facsimile function. The image forming apparatus 10 is roughly composed of an apparatus body 11, the image reading section 110 disposed above the apparatus body 11, and a connecting portion 12 provided between the image reading section 110 and the apparatus body 11.

The apparatus body 11 is made up to include an image forming section 120, a sheet feed section 13, and so on.

In an image forming operation of the image forming apparatus 10, the image forming section 120 forms a toner image on a recording paper sheet fed from the sheet feed section 13 based on image data generated by the image reading section 110 having read an original document placed on a document feeding tray 111 or other image data. Thereafter, the toner image formed on the recording paper sheet is heat fixed by an unshown fixing section. The recording paper sheet having an image fixed thereon by the completion of the fixing is discharged to a sheet output tray 14.

A display section 130 and an operating section 150 are disposed at the front of a housing forming a shell of the image forming apparatus 10. The display section 130 is formed to include a liquid crystal display (LCD) or an organic light-emitting diode (OLED) display.

A touch panel 140 is disposed in front of the display section 130. The touch panel 140 is a touch panel of, for example, a so-called resistive film system or a capacitance system and is configured to detect a user's touch of the touch panel 140 together with the point of touch. When detecting the user's touch, the touch panel 140 outputs a detection signal indicating a coordinate point of the point of touch.

The operating section 150 is hard keys including, for example, a menu key for calling up a menu, arrow keys for moving the focus of a GUI composing the menu, a determination key for performing a determination operation for the GUI composing the menu, and so on.

A storage section 160 is a large storage device, such as an HDD (hard disk drive), and is configured to store, for example, image data generated by the image reading section 110.

A communication section 170 is a network interface composed of a communication module, such as a LAN board.

The image forming apparatus 10 further includes a control unit 100. The control unit 100 is composed of a CPU (central processing unit), a RAM (random access memory), a ROM (read only memory), and so on. When an image forming apparatus control program stored in the above ROM or the storage section 160 is executed by the above CPU, the control unit 100 functions as a control section 101, an operation control section 102, an acceptance section 103, and a storage region generating section 104. Alternatively, each of the control section 101, the operation control section 102, the acceptance section 103, and the storage region generating section 104 of the control unit 100 may not be implemented by the operation of the control unit 100 in accordance with the image forming apparatus control program but may be constituted by a hardware circuit.

The control section 101 governs the overall control of the image forming apparatus 10.

The operation control section 102 governs the operation control of the image forming apparatus 10. The operation control section 102 is connected to the image reading section 110, the image forming section 120, the display section 130, the storage section 160, the communication section 170, and so on and performs the operation control of the above components connected thereto. The details of processing of the operation control section 102 will be described hereinafter.

The acceptance section 103 has the function of accepting, based on a detection signal output from the touch panel 140, a user's gesture on the touch panel 140. Furthermore, the acceptance section 103 also has the function of accepting a user's operation using the operating section 150, such as a hardware key.

The storage region generating section 104 has the function of, when the acceptance section 103 accepts a generation instruction to generate a storage region (signage-specific storage region) associated with a digital signage device 20, generating in the storage section 160 a signage-specific storage region associated one-to-one with the digital signage device 20. When a new digital signage device 20 is introduced, an operator can enter the above generation instruction using the operating section 150 or so on to generate in the storage section 160 a signage-specific storage region associated one-to-one with the new digital signage device 20. Thus, the new digital signage device 20 is registered in the image forming apparatus 10, which makes it possible for the image forming apparatus 10 to generate and register image data and so on for the new digital signage device 20 and change the contents of an informing image to be displayed on the new digital signage device 20.

The storage section 160 has a plurality of storage regions and at least one of them is associated one-to-one with a digital signage device 20. In an example shown in FIG. 4, there are three user boxes 161A to 161C as signage-specific storage regions and one user box 161D as a non-signage-specific storage region in the storage section 160. The user box 161A is associated with the digital signage device 20A, the user box 161B is associated with the digital signage device 20B, and the user box 161C is associated with the digital signage device 20C. In contrast, the user box 161D is not associated with any digital signage device 20.

Next, a description will be given of the structure and configuration of each digital signage device 20. The digital signage device 20 includes a control unit 200, a display section 210, a storage section 220, a communication section 230, and so on. The display section 210 is formed of a liquid crystal display, an organic light-emitting diode display or the like. The storage section 220 is a large storage device, such as an HDD. The communication section 230 is a network interface composed of a communication module, such as a LAN board.

The control unit 200 is composed of a CPU, a RAM, a ROM, and so on. When a control program stored in the above ROM or the storage section 220 is executed by the above CPU, the control unit 200 functions as a control section 201, a display control section 202, and a communication control section 203. Alternatively, each of the control section 201, the display control section 202, and the communication control section 203 of the control unit 200 may not be implemented by the operation of the control unit 200 in accordance with the control program but may be constituted by a hardware circuit.

The control section 201 governs the overall operation control of the digital signage device 20.

The communication control section 203 has the function of controlling the communication operation of the communication section 230. Specifically, the communication control section 203 allows the communication section 230 to receive image data and programming information sent from the image forming apparatus 10.

The display control section 202 has the function of controlling the display operation of the display section 210. Specifically, the display control section 202 analyzes programming information received by the communication section 230 and, based on the analysis result, allows the display section 210 to display image data received by the communication section 230.

As will hereinafter be described in detail, the programming information sent from the digital signage device 20 contains, for example, a display setting of how the digital signage device 20 displays a plurality of pieces of image data. For example, when the selected display setting is a slide show display format setting in which a plurality of pieces of image data are sequentially displayed by switching from one piece to another, the display control section 202 allows the display section 210 to provide a slide show display of the plurality of pieces of image data sent from the digital signage device 20. For another example, when the selected display setting is a list display format setting in which two or more of a plurality of pieces of image data are displayed at a time, the display control section 202 allows the display section 210 to display all or part of a list of the plurality of pieces of image data sent from the digital signage device 20.

The above is the description of the configuration of the digital signage system 1. Subsequently, a description will be given of processing for delivering image data in the digital signage system 1 with reference to FIGS. 3 and 4.

Figure 3:
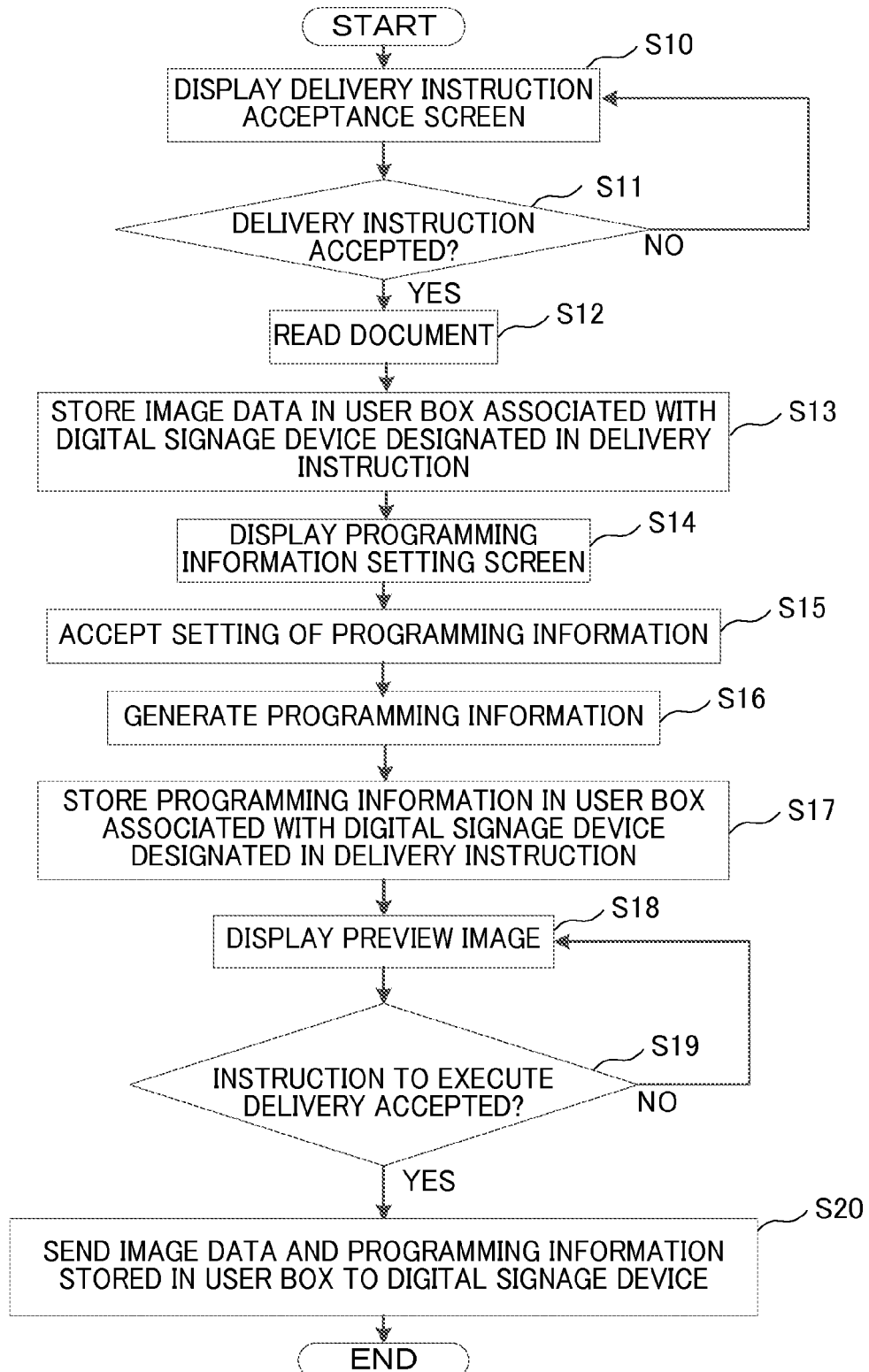
FIG. 3 is a flowchart showing a flow of processing for delivering image data in an image forming apparatus according to the one embodiment of the present disclosure.
Figure 4:
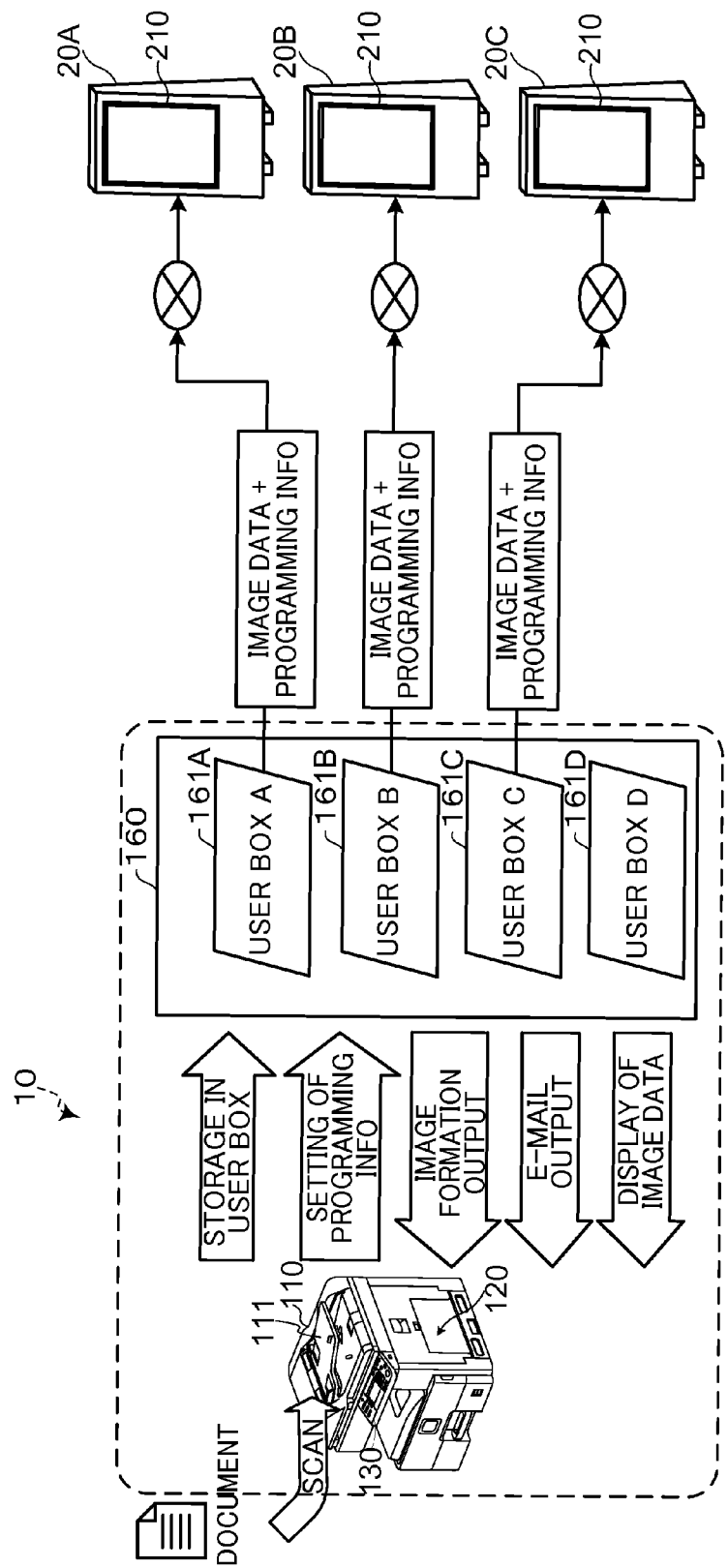
FIG. 4 is a diagram schematically showing a processing flow in the digital signage system according to the one embodiment of the present disclosure.

FIG. 3 is a flowchart showing a flow of processing for delivering image data in the image forming apparatus 10 according to the one embodiment of the present disclosure. FIG. 4 is a diagram schematically showing a processing flow in the digital signage system 1 according to the one embodiment of the present disclosure.

The operation control section 102 allows the display section 130 to display a predetermined delivery instruction acceptance screen (step S10). The acceptance section 103 determines, on the delivery instruction acceptance screen, whether or not to have accepted a delivery instruction (step S11).

Figure 5:
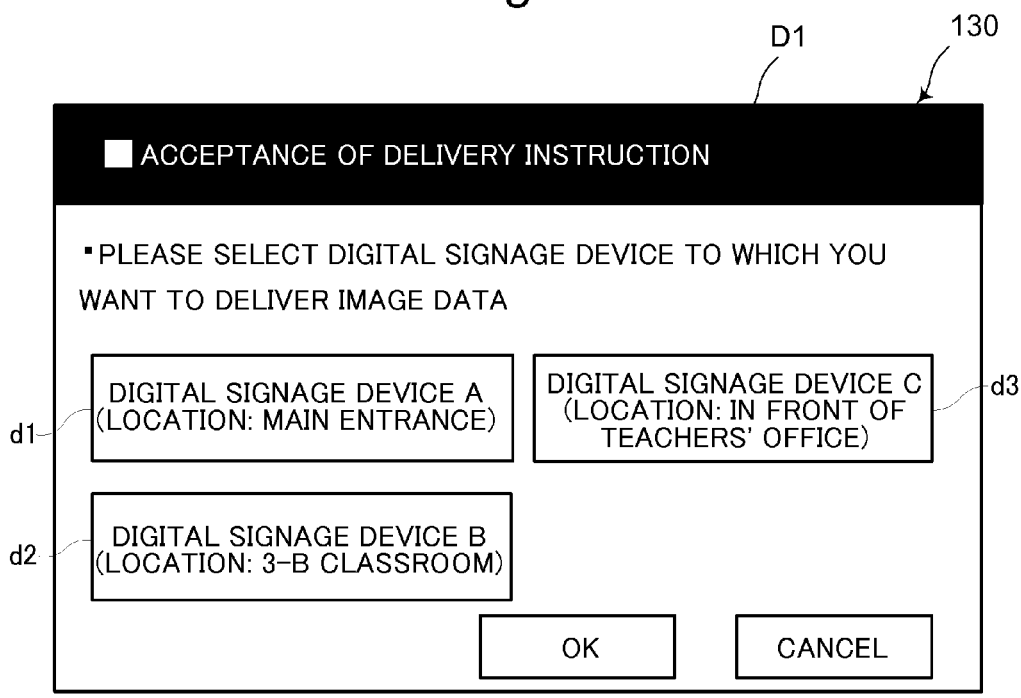
FIG. 5 is a view showing an example of a delivery instruction acceptance screen displayed on a display section of the image forming apparatus according to the one embodiment of the present disclosure.

FIG. 5 is a view showing an example of a delivery instruction acceptance screen displayed on the display section 130. In an example shown in FIG. 5, a list of digital signage devices 20 connected to the image forming apparatus 10 is displayed, together with their locations of installation, on the delivery instruction acceptance screen D1. Furthermore, a plurality of buttons from d1 to d3 are arranged on the delivery instruction acceptance screen D1. An operator pushes any buttons from d1 to d3 using the touch panel 140 or the operating section 150 to enter a delivery instruction to deliver image data. The acceptance section 103 accepts a delivery instruction designating as destinations the respective digital signage devices 20 corresponding to the one or more buttons pushed by the operator.

When the acceptance section 103 accepts the delivery instruction (YES in step S11), the operation control section 102 allows the image reading section 110 to read (scan) an original document placed on the document feeding tray 111 (step S12). Then, the operation control section 102 allows the storage section 160 to store the image data generated by the image reading section 110 having read the original document in the one or more respective signage-specific storage regions (user boxes) associated with the one or more digital signage devices 20 designated in the delivery instruction accepted by the acceptance section 103 (step S13). In the case where a plurality of original documents are placed on the document feeding tray 111, the image reading section 110 sequentially scans the plurality of original documents to generate respective pieces of image data for the original documents.

After the storage section 160 stores the image data, the operation control section 102 allows the display section 130 to display a predetermined programming information acceptance screen (setting screen) (step S14). The acceptance section 103 accepts a setting of programming information based on a user's operation entered on the predetermined programming information acceptance screen (setting screen) (step S15).

FIG. 6A is a view showing an example of a programming information acceptance screen displayed on the display section 130. The programming information acceptance screen D2 is displayed in the case where a plurality of original documents have been read in the processing at step S12 and a plurality of pieces of image data are accordingly stored in the signage-specific storage region associated with the relevant digital signage device 20. The programming information acceptance screen D2 is a setting screen for accepting the selection of a format for displaying a plurality of pieces of image data stored in the signage-specific storage region associated with the relevant digital signage device 20 and includes a plurality of buttons d4 and d5 arranged thereon.

When the button d5 is pushed by the operator, the operation control section 102 determines the slide show display format setting as a display setting for image data. When the digital signage device 20 receives programming information in which the slide show display format setting is selected as a display setting for image data, the display control section 202 of the digital signage device 20 allows the display section 210 to display a plurality of images from p1 to p6 superposed one on another as shown in FIG. 6B. Then, the display control section 202 allows the display section 210 to sequentially display the plurality of images from p1 to p6 by switching from one image to another at predetermined time intervals (slide show display).

On the other hand, when the button d4 is pushed by the operator, the operation control section 102 determines the list display format setting as a display setting for image data. When the digital signage device 20 receives programming information in which the list display format setting is selected as a display setting for image data, the display control section 202 of the digital signage device 20 allows the display section 210 to display the plurality of images from p1 to p6 in a line or matrix as shown in FIG. 6C (list display).

Settings selectable as the programming information include, in addition to the above display setting, a setting of the display layout of image data, a setting of the display period of image data, and a setting of the display order of pieces of image data.

Figure 7A:
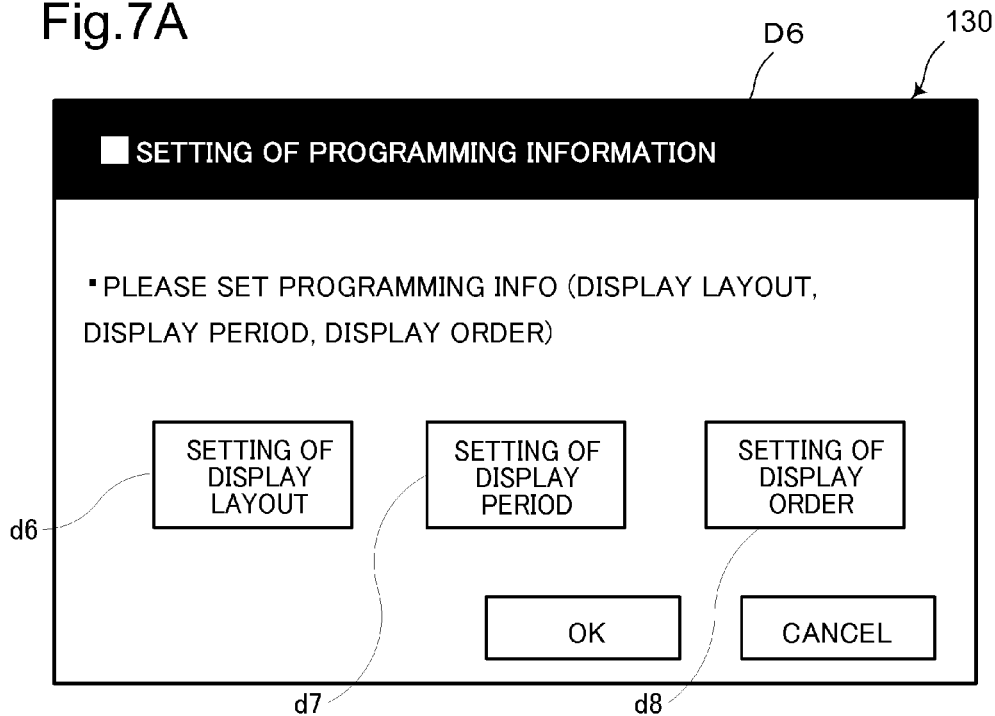
FIG. 7A is a view showing another example of a programming information acceptance screen displayed on the display section of the image forming apparatus according to the one embodiment of the present disclosure.

FIG. 7A is a view showing another example of a programming information acceptance screen displayed on the display section 130. In an example shown in FIG. 7A, a plurality of buttons from d6 to d8 are arranged on the programming information acceptance screen D6.

When the button d6 is pushed by the operator, the acceptance section 103 accepts a setting of the display layout of image data as a setting of programming information. The setting of the display layout of image data herein refers to a setting indicating where image data is to be displayed on the display section 210 of the relevant digital signage device 20.

Figure 7B:
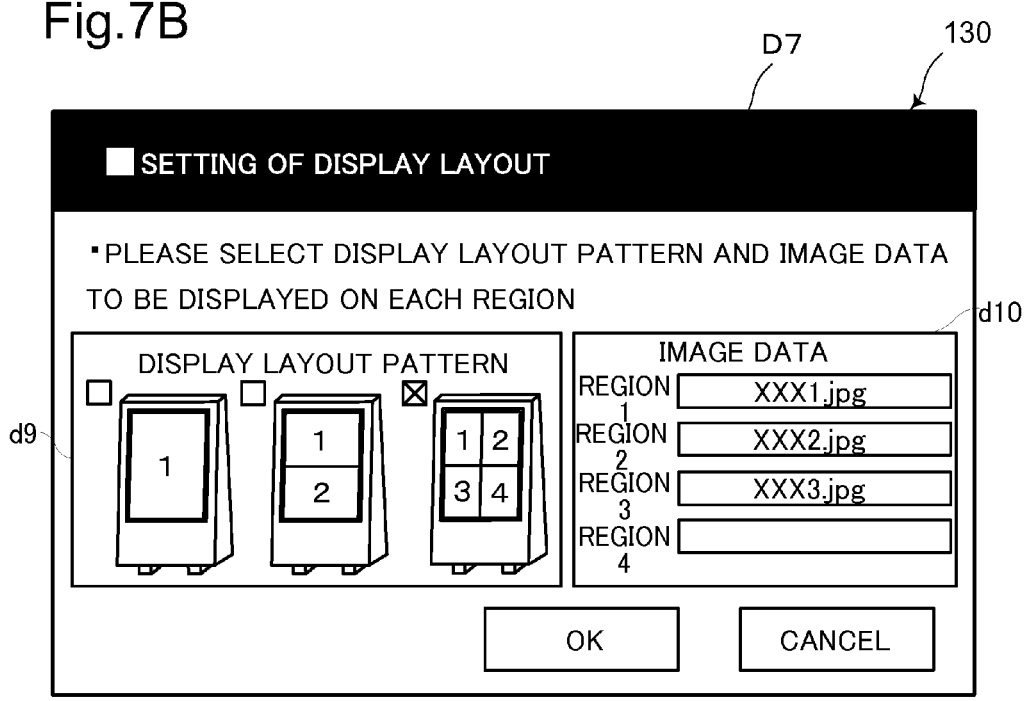
FIG. 7B is a view showing an example of a display layout acceptance screen displayed on the display section.

FIG. 7B is a view showing an example of a display layout acceptance screen displayed on the display section 130. In an example shown in FIG. 7B, a display layout pattern acceptance screen d9 and an image data setting screen d10 are shown on the display layout acceptance screen D7. Three display layouts are presented as display layout patterns for a display region of the display section 210 on the display layout pattern acceptance screen d9. The three display layouts include: a display layout where the display region is not divided (left); a display layout where the display region is divided into two subregions (middle); and a display layout where the display region is divided into four subregions (right). The acceptance section 103 accepts, based on a user's operation entered using the touch panel 140 or the operating section 150, one of the three display layouts presented on the display layout pattern acceptance screen d9 as the display layout pattern for the display region of the display section 210. Furthermore, one or more pieces of image data capable of being displayed on the entire display region or each display subregion of the display section 210 are indicated on the image data setting screen d10. The acceptance section 103 accepts, based on a user's operation entered using the touch panel 140 or the operating section 150, the designation of a piece of image data to be displayed on the entire display region or each display subregion of the display section 210 from among all of one or more pieces of image data stored in the associated signage-specific storage region of the storage section 160.

Referring back to FIG. 7A, when the button d8 is pushed by the operator, the acceptance section 103 accepts a setting of the display order of pieces of image data as a setting of programming information. The setting of the display order of pieces of image data herein refers to a setting indicating in which order pieces of image data are to be displayed on the display section 210 of the relevant digital signage device 20.

Figure 8A:
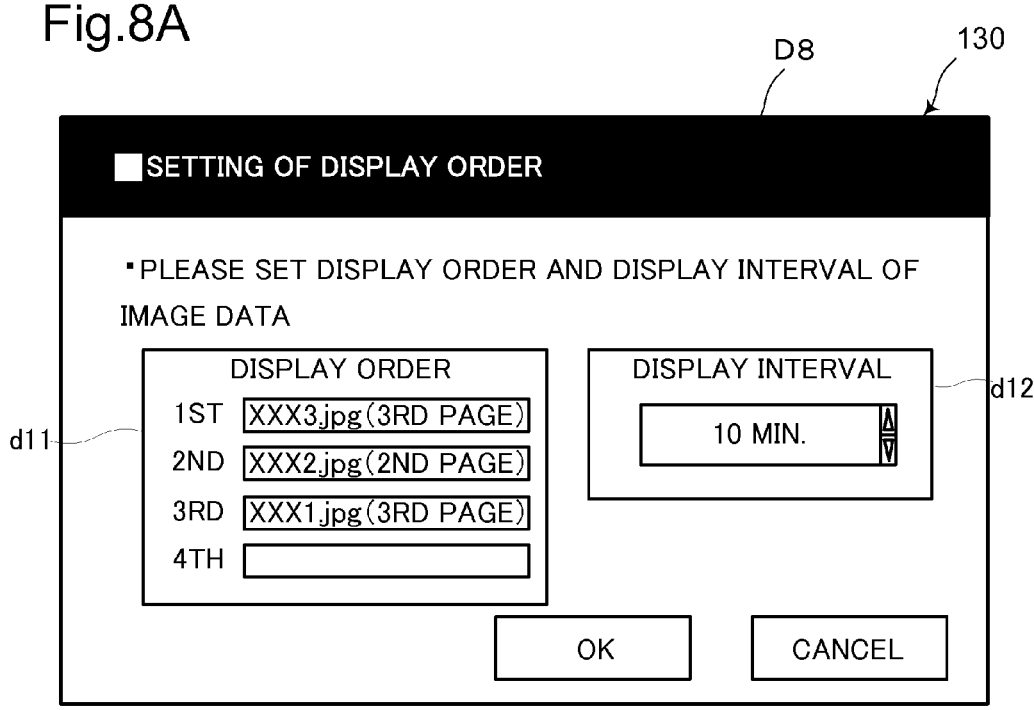
FIG. 8A is a view showing an example of a display order acceptance screen displayed on the display section of the image forming apparatus according to the one embodiment of the present disclosure.

FIG. 8A is a view showing an example of a display order acceptance screen displayed on the display section 130. In an example shown in FIG. 8A, an image data acceptance screen d11 and a display interval acceptance screen d12 are shown on the display order acceptance screen D8. Pieces of image data capable of being displayed at each position of the display order are indicated on the image data acceptance screen d11. The acceptance section 103 accepts, based on a user's operation entered using the touch panel 140 or the operating section 150, the designation of a piece of image data to be displayed at each position of the display order from among the pieces of image data stored in the associated signage-specific storage region of the storage section 160. Furthermore, various options of the time interval at which the display of image data on the relevant digital signage device 20 can be switched are presented on the display interval acceptance screen d12. The acceptance section 103 accepts the designation of a time interval based on a user's operation entered using the touch panel 140 or the operating section 150.

Referring back to FIG. 7A, when the button d7 is pushed by the operator, the acceptance section 103 accepts a setting of the display period of image data as a setting of programming information. The setting of the display period of image data herein refers to a setting indicating how long the image data is to be displayed on the relevant digital signage device 20.

Figure 8B:
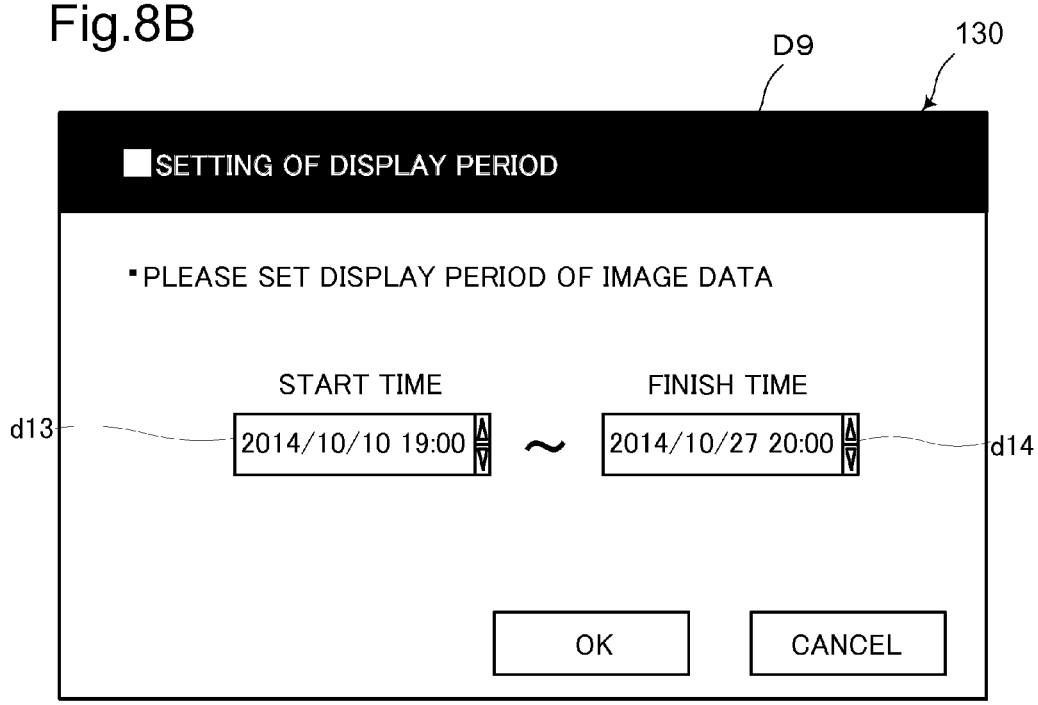
FIG. 8B is a view showing an example of a display period acceptance screen displayed on the display section.

FIG. 8B is a view showing an example of a display period acceptance screen displayed on the display section 130. In an example shown in FIG. 8B, a start time indication field d13 indicating the start time of display of image data and a finish time indication field d14 indicating the finish time of display of image data are shown on the display period acceptance screen D9. The acceptance section 103 accepts the designations of a start time of display of image data and a finish time of display of image data, each based on a user's operation entered using the touch panel 140 or the operating section 150.

In the above manners, when the acceptance section 103 accepts the display setting or so on for the plurality of pieces of image data as a setting of programming information, the operation control section 102 generates programming information based on the accepted setting (step S16).

Then, the operation control section 102 allows the storage section 160 to store the programming information generated in the processing at step S16 in the respective signage-specific storage regions associated with the one or more digital signage devices 20 designated in the delivery instruction accepted by the acceptance section 103 (step S17). Thus, the one or more signage-specific storage regions of the storage section 160 store image data to be displayed by the one or more respective digital signage devices 20 and programming information indicating a setting of how the one or more digital signage devices 20 display the image data.

The operation control section 102 allows the display section 130 to display, based on the image data and programming information stored in each signage-specific storage region of the storage section 160, a preview image indicating a display screen to be displayed on the relevant digital signage device 20 (step S18).

Thereafter, when the acceptance section 103 accepts an instruction to execute delivery (YES in S19), the operation control section 102 allows the communication section 170 to deliver the image data by sending the image data and programming information stored in the signage-specific storage region to the relevant digital signage device 20 (step S20).

A general digital signage system requires a dedicated management server separately from digital signage devices. The generation and registration of image data and so on on the dedicated management server are often complicated. Particularly in the case where there are a plurality of pieces of image data to be displayed, a complicated operation is required when an operator sets, on the dedicated management server, how the plurality of pieces of mage data are displayed on the digital signage device. Future digital signage devices can be considered to be introduced not only into large facilities, such as station yards, but also into relatively small facilities, such as schools. However, it is difficult to install a dedicated management server in small facilities. In addition, in small facilities, because it is difficult to put a dedicated staff for managing a digital signage device, a teacher or so on, which is a non-dedicated staff, will generate and register image data and so on. Therefore, it is preferred that the method for operating the digital signage device should be simple.

To cope with the above problems, the image forming apparatus 10 according to the one embodiment of the present disclosure includes signage-specific storage regions associated one-to-one with digital signage devices 20 and each signage-specific storage region stores: a plurality of pieces of image data generated by the image reading section 110 having read a number of original documents; and setting data indicating a display setting of how the relevant digital signage device 20 displays the plurality of pieces of image data. Thus, the operator can register a plurality of pieces of image data to be displayed on each digital signage device 20 with a simple operation, as before, of designating a destination for storage of the image data and scanning a number of original documents. Furthermore, even when there are a plurality of pieces of image data to be displayed, the operator can set how the plurality of pieces of mage data are displayed on the digital signage device. In addition, in the image forming apparatus 10 according to the one embodiment of the present disclosure, a set of image data and programming information is stored in each of signage-specific storage regions associated one-to-one with the digital signage devices 20. Therefore, the operator can easily confirm or change the contents of image data and programming information later.

Next, a description will be given of processing for outputting image data in the digital signage system 1 with reference to FIGS. 9 and 4.

Figure 9:
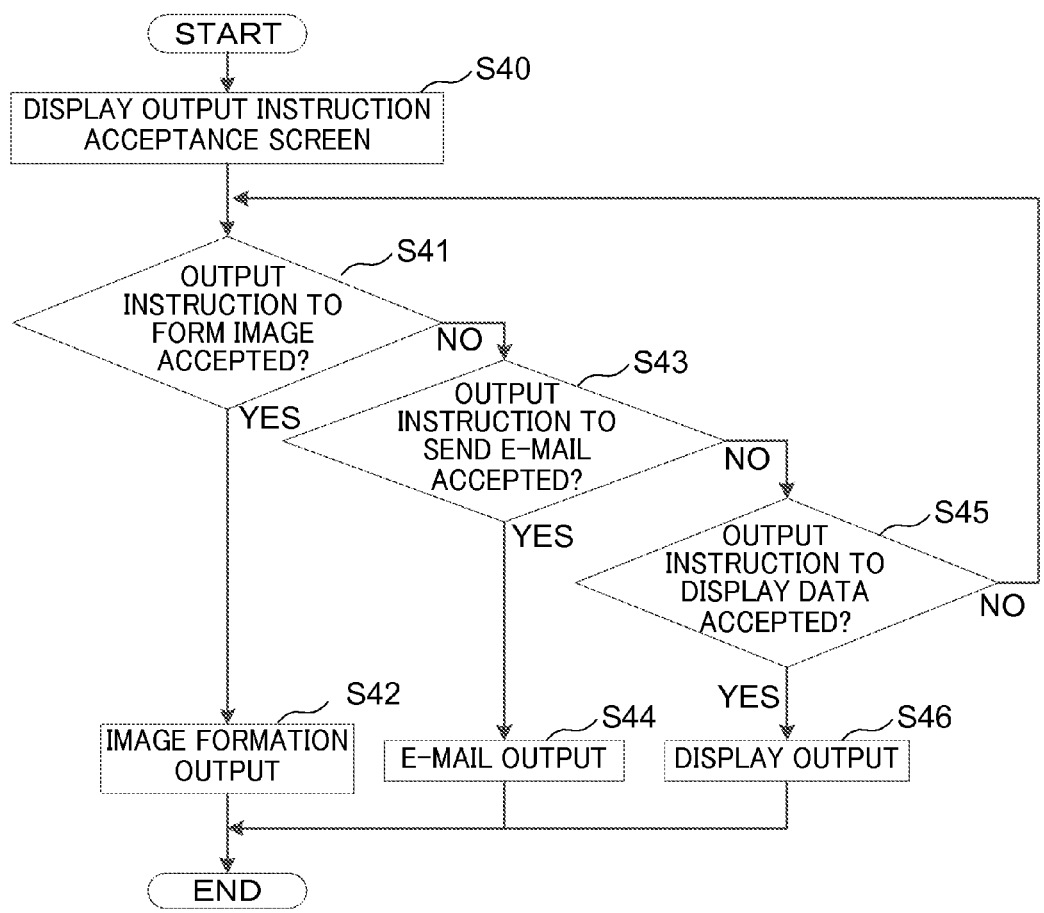
FIG. 9 is a flowchart showing a flow of processing for outputting image data in the image forming apparatus according to the one embodiment of the present disclosure.

FIG. 9 is a flowchart showing a flow of processing for outputting image data in the image forming apparatus 10 according to the one embodiment of the present disclosure.

The operation control section 102 allows the display section 130 to display a predetermined output instruction acceptance screen (step S40). The acceptance section 103 accepts an output instruction on the output instruction acceptance screen (step S41, S43 or S45).

Figure 10:
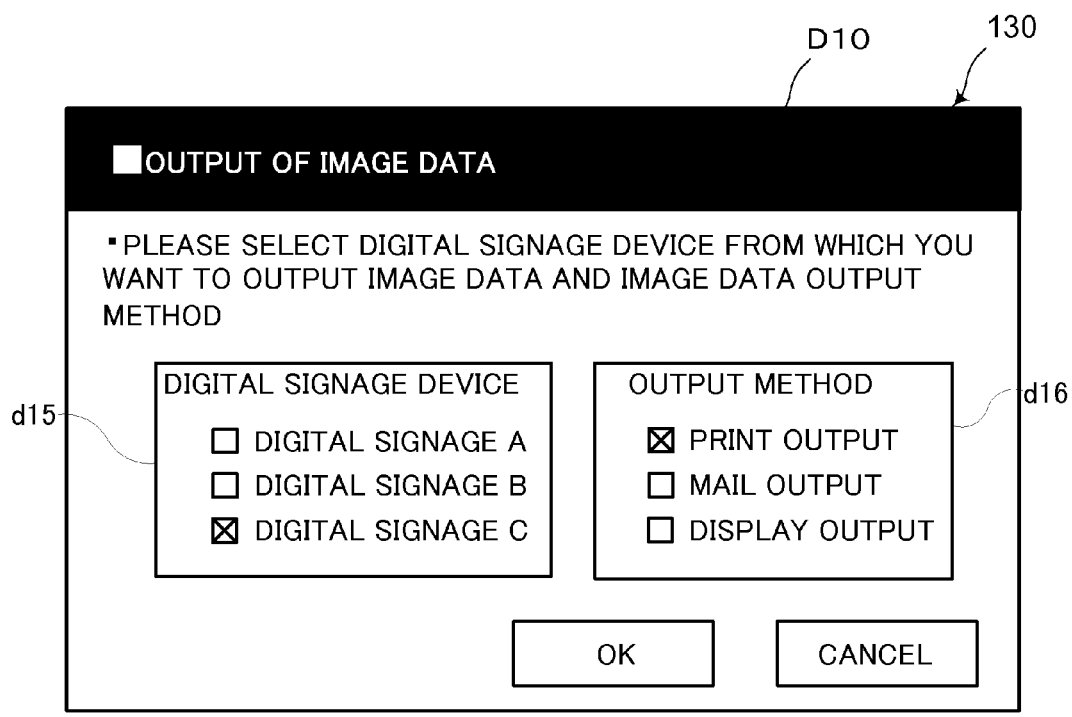
FIG. 10 is a view showing an example of an output instruction acceptance screen displayed on the display section of the image forming apparatus according to the one embodiment of the present disclosure.

FIG. 10 is a view showing an example of an output instruction acceptance screen displayed on the display section 130. In an example shown in FIG. 10, an output source acceptance screen d15 for accepting the designation of a digital signage device serving as a source of data output and an output method acceptance screen d16 for accepting the designation of a method for outputting data are shown on the output instruction acceptance screen D10. The output source acceptance screen d15 shows a list of digital signage devices 20 connected to the image forming apparatus 10. The acceptance section 103 accepts the designation of one digital signage device 20 as a source of data output from among the list of digital signage devices 20. Furthermore, the output method acceptance screen d16 shows three output methods including print output, mail output, and display output. The acceptance section 103 accepts the designation of one output method from among the three output methods.

When the acceptance section 103 accepts an output instruction to form an image (YES in step S41), the operation control section 102 allows the image forming section 120 to form an image on a recording paper sheet based on image data stored in the signage-specific storage region associated with the digital signage device 20 designated in the output instruction (step S42). The operation control section 102 may allow the image forming section 120 to form programming information stored in the same signage-specific storage region, together with the image data, on the recording paper sheet.

When the acceptance section 103 accepts an output instruction to send an e-mail (YES in step S43), the operation control section 102 allows the communication section 170 to send an e-mail to which image data stored in the signage-specific storage region associated with the digital signage device 20 designated in the output instruction is attached (step S44). The storage section 160 previously stores the address of the e-mail. The communication section 170 sends the e-mail to the address stored in the storage section 160. The operation control section 102 may allow the communication section 170 to attach programming information stored in the same signage-specific storage region, together with the image data, to the e-mail. Alternatively, when a user enters an e-mail address using the touch panel 140 or the operating section 150 and the acceptance section 103 accepts the e-mail address as a destination, the operation control section 102 may allow the communication section 170 to send the e-mail.

When the acceptance section 103 accepts an output instruction to display data (YES in step S45), the operation control section 102 allows the display section 130 to display image data stored in the signage-specific storage region associated with the digital signage device 20 designated in the output instruction (step S46). The operation control section 102 may allow the display section 130 to display programming information stored in the same signage-specific storage region, together with the image data.

As thus far described, the image forming apparatus 10 according to the one embodiment of the present disclosure stores image data and programming information in each of the signage-specific storage regions associated one-to-one with digital signage devices 20 and can output them using the image forming function, the communication function, the display function, or so on with which the image forming apparatus 10 is equipped. Therefore, in the image forming apparatus 10 according to the one embodiment of the present disclosure, information presented on each digital signage device 20 can be output with a simple operation in various output methods.

The present disclosure is not limited to the configuration of the above embodiment and can be modified in various ways.

Modification 1

The description in the above embodiment has been given of the case where when the acceptance section 103 accepts a display setting entered on the setting screen, the operation control section 102 allows the relevant signage-specific storage region to store setting data indicating the entered display setting. Unlike this, in an image forming apparatus 10 according to Modification 1, the operation control section 102 is configured to analyze the contents of a plurality of pieces of image data stored in the relevant signage-specific storage region and determines a display setting based on results of the analyzation. Furthermore, the operation control section 102 allows the storage section 160 to store setting data indicating the determined display setting in the signage-specific storage region.

Figure 11:
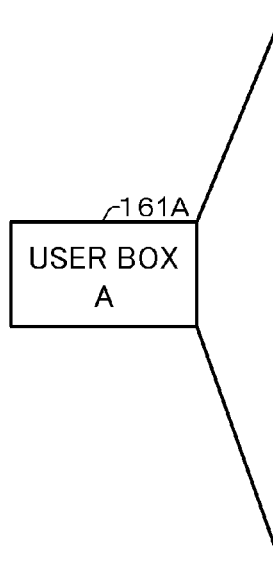
FIG. 11 is a diagram showing an example of results of image data analysis performed by an operation control section of an image forming apparatus according to Modification 1.

FIG. 11 is a diagram showing an example of results of image data analysis performed by the operation control section 102 of the image forming apparatus 10 according to Modification 1. The pieces of image data stored in the signage-specific storage region are analyzed by the operation control section 102. The analysis results of the operation control section 102 are stored, together with the pieces of image data, in the signage-specific storage region.

The operation control section 102 determines to which type of region each pixel contained in each of the pieces of image data stored in the signage-specific storage region belongs, for example, to which of a character region, a ground region, and a photographic region each pixel belongs. The character region is a region showing characters and symbols, the ground region is a region showing the ground (a blank portion) of an original document, and the photographic region is a region showing a photograph portion of the original document. The operation control section 102 makes the above determination based on various pieces of information, including the proportion of white pixels to total pixels, the number of continuous white pixels, and the density difference between adjacent pixels. In an example shown in FIG. 11, the signage-specific storage region of the storage section 160 stores the respective types of region of the pieces of image data as ANALYSIS RESULTS 1.

Furthermore, the operation control section 102 determines whether each of the pieces of image data stored in the signage-specific storage region is a colored piece of image data containing a color image or a black-and-white piece of image data containing no color image. In the example shown in FIG. 11, the signage-specific storage region of the storage section 160 stores the respective types of color of the pieces of image data, indicating a colored piece of image data or a black-and-white piece of image data, as ANALYSIS RESULTS 2.

Based on the above determination results, the operation control section 102 determines the display setting for the plurality of pieces of image data stored in the signage-specific storage region. Specifically, when the proportion of pieces of image data made from a photographic region only and pieces of image data partly made from a photographic region in the plurality of pieces of image data stored in the signage-specific storage region is equal to or greater than a predetermined proportion, the operation control section 102 determines the list display format setting as a display setting. Alternatively, when the proportion of pieces of image data made from a character region only in the plurality of pieces of image data is equal to or greater than a predetermined proportion, the operation control section 102 determines the slide show display format setting as a display setting.

When the list display format setting is selected as a display setting, the plurality of pieces of image data can be displayed at a time, but the display size of each piece of image data is small, which reduces the distinguishability among the pieces of image data. In this relation, pieces of image data containing a photographic region are suitable for a list display because they can be more easily distinguished from each other by a user than those containing no photographic region and made from a character region only. On the other hand, the slide show display can ensure a large display size of each piece of image data and is therefore suitable to display pieces of image data made from a character region only. The image forming apparatus 10 according to Modification 1 can display a plurality of images on the digital signage device 20 with a display setting suitable for a plurality of pieces of image data stored in the relevant signage-specific storage region, even if the operator does not enter any display setting.

Furthermore, the operation control section 102 determines the display setting based on whether the plurality of pieces of image data stored in the relevant signage-specific storage region are colored pieces of image data or black-and-white pieces of image data. Specifically, when the proportion of colored pieces of image data in the plurality of pieces of image data stored in the signage-specific storage region is equal to or greater than a predetermined proportion, the operation control section 102 determines the list display format setting as a display setting. Alternatively, when the proportion of black-and-white pieces of image data in the plurality of pieces of image data is equal to or greater than a predetermined proportion, the operation control section 102 determines the slide show display format setting as a display setting. The reason for this is that colored pieces of image data can be more easily distinguished from each other by a user than black-and-white pieces of image data and are therefore suitable for a list display.

Figure 12:
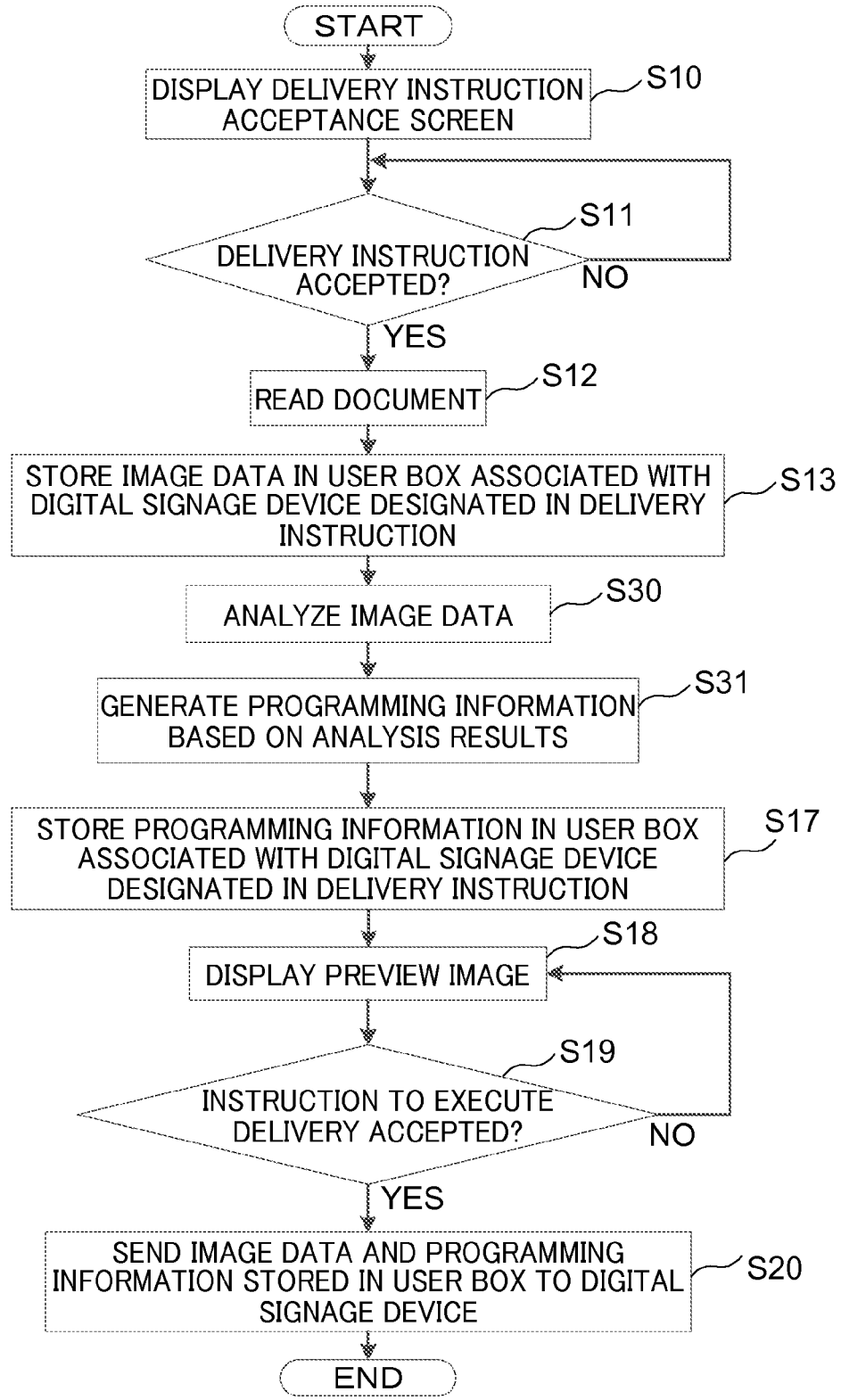
FIG. 12 is a flowchart showing a flow of processing for delivering image data in the image forming apparatus according to Modification 1.

FIG. 12 is a flowchart showing a flow of processing for delivering image data in the image forming apparatus 10 according to Modification 1. The same pieces of processing as those shown in FIG. 3 are designated by the same references and further explanation thereof will be omitted.

After the processing at step S13, the operation control section 102 analyzes the plurality of pieces of image data stored in the relevant signage-specific storage region (step S30). Then, the operation control section 102 determines the display setting for the plurality of pieces of image data based on the analysis results and generates programming information containing the display setting (step S31).

Then, the operation control section 102 allows the storage section 160 to store the programming information generated in the processing at step S31 in the respective signage-specific storage regions associated with the one or more digital signage devices 20 designated in the delivery instruction accepted by the acceptance section 103 (step S17).

Modification 2

The operation control section 102 may determine, based on a user's operation accepted by the acceptance section 103, one or more pieces of image data to be displayed on the relevant digital signage device 20 from among the plurality of pieces of image data stored in the associated signage-specific storage region and generate programming information containing as a display setting a display image setting indicating the determined one or more pieces of image data to be displayed.

Figure 13:
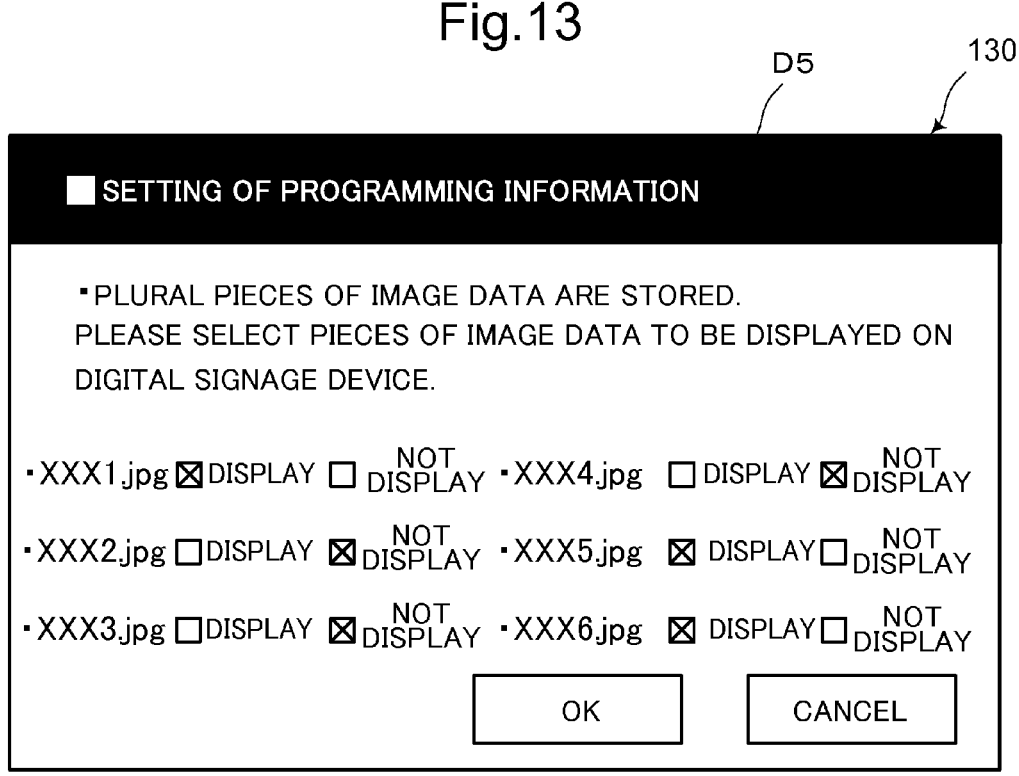
FIG. 13 is a view showing an example of a programming information acceptance screen displayed on a display section of an image forming apparatus according to Modification 2.

FIG. 13 is a view showing an example of a programming information acceptance screen displayed on the display section 130 in Modification 2. The programming information acceptance screen D5 shows a list of a plurality of pieces of image data stored in a signage-specific storage region. In an example shown in FIG. 13, three pieces of image data "xxx1.jpg", "xxx5.jpg", and "xxx6.jpg" of six pieces of image data are selected as pieces of image data to be displayed. The operation control section 102 generates programming information containing a display image setting indicating that the three pieces of image data are to be displayed and allows the relevant signage-specific storage region to store the generated programming information.

Thus, in the presence of a plurality of pieces of image data, the image forming apparatus 10 according to Modification 2 can select, from among the plurality of pieces of image data, one or more pieces of image data to be displayed on the relevant digital signage device 20 with a simple operation.

Modification 3

FIG. 14 is a diagram schematically showing a processing flow in a digital signage system according to Modification 3. Further explanation of the same elements as those shown in FIG. 4 will be omitted.

An image forming apparatus 10 according to Modification 3 includes a connection terminal capable of connecting a USB memory 40 which is a portable storage medium. Furthermore, the image forming apparatus 10 according to Modification 3 is configured to deliver image data and programming information stored in each signage-specific storage region of the storage section 160 not only by sending them via a LAN to the relevant digital signage device 20 but alternatively by outputting them to the USB memory 40 which is a portable storage medium.

When a digital signage device 20 designated in an instruction to execute delivery is not connected to a LAN or the like, the image forming apparatus 10 cannot deliver image data and programming information to the digital signage device 20. In this case, the operation control section 102 allows the USB memory 40 to store the image data and the programming information. Specifically, when the acceptance section 103 accepts the instruction to execute delivery, the operation control section 102 determines whether or not data communication with each digital signage device 20 designated in the instruction to execute delivery is possible. If the image forming apparatus 10 is unable to communicate data with the digital signage device 20 designated in the instruction to execute delivery, the operation control section 102 allows the image forming apparatus 10 to output to the USB memory 40 the image data and the programming information stored in the signage-specific storage region associated with the digital signage device 20 designated in the instruction to execute delivery. Then, the operator connects the USB memory 40 to a USB terminal of the digital signage device 20. When detecting that the USB memory 40 has been connected to the USB terminal, the control section 201 of the digital signage device 20 allows the storage section 220 to record the image data and the programming information stored in the USB memory 40. In this manner, the operator can generate and register image data and programming information on the image forming apparatus 10, even for digital signage devices 20 not connected via a LAN to the image forming apparatus 10.

Furthermore, in the image forming apparatus 10 according to a modification, the communication section 170 is operable to communicate data with external information processing apparatuses 30, such as a mobile terminal 30A and a PC (personal computer) 30B. In each information processing apparatus 30, image data to be displayed on the one or more digital signage devices 20 and a delivery instruction to deliver the image data are generated. The communication section 170 receives, under the control of the operation control section 102, the image data and the delivery instruction generated by the information processing apparatus 30. The operation control section 102 generates programming information based on the delivery instruction received by the communication section 170. Then, the operation control section 102 allows the storage section 160 to store the generated programming information, together with the image data, in the one or more respective signage-specific storage regions associated with the one or more digital signage devices 20 designated in the delivery instruction. Thus, the image data generated in the information processing apparatus 30 provided externally of the image forming apparatus 10 can be delivered to the one or more digital signage devices 20.

Other Modifications

The image forming apparatus control program described in the above embodiment and modifications may be one stored on a computer-readable non-transitory recording medium, such as a hard disk, a CD-ROM, a DVD-ROM or a semiconductor memory.

The configurations and pieces of processing described with reference to FIGS. 1 to 14 are merely illustrative of the present disclosure and are not intended to limit the present disclosure to these configurations and pieces of processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:
1. An image forming apparatus comprising:
an image reading section operable to read an original document and generate image data from the read original document;
a storage section operable to store the image data generated by the image reading section;
a communication section operable to communicate data with one or more external digital signage devices;
an acceptance section configured to accept a delivery instruction to deliver the image data with the one or more digital signage devices designated as destinations; and
an operation control section configured to control the operation of reading the original document and generating the image data performed by the image reading section, the operation of storing the image data performed by the storage section, and the operation of communicating data performed by the communication section,
wherein the storage section has a plurality of storage regions at least one or more of which are signage-specific storage regions associated one-to-one with the one or more digital signage devices,
each of the signage-specific storage regions stores: a plurality of pieces of the image data generated by the image reading section having read a number of original documents; and setting data indicating a display setting of how the relevant digital signage device displays the plurality of pieces of image data,
the operation control section is configured to, when the acceptance section accepts the delivery instruction, allow the communication section to send the plurality of pieces of image data and the setting data both stored in the signage-specific storage region associated with the relevant digital signage device designated in the delivery instruction to the digital signage device designated in the delivery instruction, the operation control section is further configured to analyze contents of the plurality of pieces of image data stored in the relevant signage-specific storage region and allow the storage region to store results of the analyzation, determine the display setting based on the results of the analyzation, and allow the storage region to store setting data indicating the determined display setting in the signage-specific storage region, settings selectable as the display setting include a list display format setting in which two or more of the plurality of pieces of image data are displayed at a time and a slide show display format setting in which the plurality of pieces of image data are sequentially displayed by switching from one piece to another, and the operation control section is further configured, based on the results of the analyzation, to: (i) determine whether or not each of the plurality of pieces of image data stored in the relevant signage-specific storage region contains a character region or a photographic region; (ii) determine the list display format setting as the display setting for the plurality of pieces of image data when a proportion of pieces of image data containing the photographic region in the plurality of pieces of image data is equal to or greater than a predetermined proportion; and (iii) determine the slide show display format setting as the display setting for the plurality of pieces of image data when a proportion of pieces of image data made from the character region only in the plurality of pieces of image data is equal to or greater than a predetermined proportion.

2. An image forming apparatus comprising:

an image reading section operable to read an original document and generate image data from the read original document;

a storage section operable to store the image data generated by the image reading section;

a communication section operable to communicate data with one or more external digital signage devices;

an acceptance section configured to accept a delivery instruction to deliver the image data with the one or more digital signage devices designated as destinations; and an operation control section configured to control the operation of reading the original document and generating the image data performed by the image reading section, the operation of storing the image data performed by the storage section, and the operation of communicating data performed by the communication section, wherein the storage section has a plurality of storage regions at least one or more of which are signage-specific storage regions associated one-to-one with the one or more digital signage devices, each of the signage-specific storage regions stores: a plurality of pieces of the image data generated by the image reading section having read a number of original documents; and setting data indicating a display setting of how the relevant digital signage device displays the plurality of pieces of image data, the operation control section is configured to, when the acceptance section accepts the delivery instruction, allow the communication section to send the plurality of pieces of image data and the setting data both stored in the signage-specific storage region associated with the relevant digital signage device designated in the delivery instruction to the digital signage device designated in the delivery instruction, the operation control section is further configured to analyze contents of the plurality of pieces of image data stored in the relevant signage-specific storage region and allow the storage region to store results of the analyzation, determine the display setting based on the results of the analyzation, and allow the storage region to store setting data indicating the determined display setting in the signage-specific storage region, settings selectable as the display setting include a list display format setting in which two or more of the plurality of pieces of image data are displayed at a time and a slide show display format setting in which the plurality of pieces of image data are sequentially displayed by switching from one piece to another, and the operation control section is further configured, based on the results of the analyzation, to: (i) determine whether each of the plurality of pieces of image data stored in the relevant signage-specific storage region is a colored piece of image data containing a color image or a black-and-white piece of image data containing no color image; (ii) determine the list display format setting as the display setting for the plurality of pieces of image data when a proportion of colored pieces of image data in the plurality of pieces of image data is equal to or greater than a predetermined proportion; and (iii) determine the slide show display format setting as the display setting for the plurality of pieces of image data when a proportion of black-and-white pieces of image data in the plurality of pieces of image data is equal to or greater than a predetermined proportion.

* * * * *